Sept. 7, 1943.   R. W. KNIGHT   2,328,559
FLIGHT LEVEL INDICATOR
Filed May 29, 1941

ROBERT WILSON KNIGHT
INVENTOR

BY J. F. Mothershead
ATTORNEY

Patented Sept. 7, 1943

2,328,559

UNITED STATES PATENT OFFICE 2,328,559

FLIGHT LEVEL INDICATOR

Robert Wilson Knight, Arlington, Va.

Application May 29, 1941, Serial No. 395,775

1 Claim. (Cl. 73—4)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to flight instruments and has for its primary object to provide an instrument whose movable indicator will be barometrically operated in accordance with variations in altitude and the face of which instrument simulates that of a compass whereby registry of the movable indicator with a point on the instrument face will visually indicate a nominal altitude coinciding with that predeterminedly set for a given compass course.

As traffic density in air navigation continues to become as ever increasing problem because of the rapidly growing numbers of private, commercial, and military aircraft, the necessity for positive vertical separation in flight becomes more apparent. It appears manifest that a uniform control plan for the prevention of collisions should be developed which will serve in peace time for the expanding needs of civil and military flying, as well as to look ahead to the eventuality of war with a greatly expanded volume of military flying.

The present system of airway traffic control has been planned and is capably operated, but growing traffic density on busy airways is becoming a problem of some magnitude.

The civil air regulations at present in vogue allow considerable latitude for flight during conditions of contact weather by not requiring specific altitudes of flight, although requiring aircraft flying contact weather to keep to the right side of radio range courses, and recommending conformance to instrument rules when above 1,000 feet. However, the regulations hold to rigid standards (Civil Air Regulations, part 60, Air Traffic Rules) during instrument conditions. The rules in part provide:

Green civil airways 60.5800. "Eastbound flights. Aircraft making good a true course of from 0° (or 360°) to, but not including, 180° along a green civil airway shall fly at an 'odd' thousand foot level (such as 3,000, 5000 or 7,000 feet)."

60.5801. "Westbound flights. Aircraft making good a true course of from 180° to, but not including, 360° (or 0°) along a green civil airway shall fly at an 'even' thousand foot level above sea level (such as 2,000, 4,000 or 6,000 feet)."

Amber civil airways 60.5810. "Northbound flights. Aircraft making good a true course of from 270° to, but not including, 90° along an amber civil airway shall fly at an 'odd' thousand foot level above seal level (such as 3,000, 5,000 or 7,000 feet)."

60.5811. "Southbound flights. Aaircraft making good a true course of from 90° to, but not including, 270° along an amber civil airway shall fly at an 'even' thousand foot level above sea level (such as 2,000, 4,000 or 6,000 feet)."

Red civil airways 60.5820. "Eastbound flights. Aircraft making good a true course of 0° (or 360°) to, but not including, 180° along a red civil airway shall fly at an 'odd' thousand foot level above sea level (such as 3,000, 5,000 or 7,000 feet)."

60.5821. "Westbound flights. Aircraft making good a true course of 180° to, but not including, 360° (or 0°) along a red civil airway shall fly at an 'even' thousand foot level above sea level (such as 2,000, 4,000 or 6,000 feet)."

Blue civil airways 60.5830. "Northbound flights. Aircraft making good a true course of from 270° to, but not including, 90° along a blue civil airway shall fly at an 'odd' thousand foot level above sea level (such as 3,000, 5,000 or 7,000 feet)."

60.5831. "Southbound flights. Aircraft making good a true course of from 90° to, but not including, 270° along a blue civil airway shall fly at an 'even' thousand foot level above sea level (such as 2,000, 4,000 or 6,000 feet)."

There are specific rules governing flight altitudes on airway intersections.

60.5840. "An aircraft flying along a green civil airway and continuing the flight through a green zone of intersection shall, while within a green zone of intersection, maintain the altitude approved for flight on the green civil airway being followed and, upon leaving a green zone of intersection, shall assume an altitude prescribed for the airway to be followed."

An aircraft flying along an amber civil airway through a green zone of intersection increases its altitude of flight 500 feet while within such zone, but when within an amber zone of intersection, it maintains the assigned altitude for the amber airway.

An aircraft flying along a red civil airway through a green zone of intersection or an amber zone of intersection increases its altitude of flight 500 feet while within such zone (thereafter assuming an altitude prescribed for the airway to be followed), but when within a red zone of intersection it maintains the assigned altitude for the red airway.

An aircraft flying along a blue civil airway and continuing flight through a green, amber, or red zone of intersection shall, while within such zone of intersection, maintain an altitude 500 feet higher than the altitude approved for flight on the blue civil airway being followed and, upon leaving such zone of intersection, shall assume an altitude prescribed for the airway to be followed.

60.585. "Flight altitudes on off-airway flights. The following rules will govern the altitudes of aircraft making instrument flights when approaching for crossing a civil airway not at a control zone of intersection:

60.5850. (a) "Eastbound flights. Aircraft making good a true course of 0° (or 360°) to, but not including, 180° shall fly at an 'odd' thousand foot level plus 500 feet, above sea level (such as 3,500, 5,500, or 7,500 feet); and 60.5851. (b) "Westbound flights. Aircraft making good a true course of 180° to, but not including, 360° (or 0°) shall fly at an even thousand foot level plus 500 feet, above sea level (such as 2,500, 4,500 or 6,500 feet)."

60.586. "Crossing an airway. Unless otherwise instructed by a bureau airway traffic control station, a civil airway shall not be crossed at an angle of less than 45° to such airway, and the appropriate altitude as prescribed in 60.585, shall be maintained throughout the entire crossing of such airway: Provided, however, That if such crossing is through any part of a zone of intersection the pertinent provisions of 60.584 shall govern, and if such crossing is through any part of a control zone of intersection the pertinent provisions of 60.571 and 60.584 shall govern."

The above rules, if thoroughly memorized and adhered to by pilots, are workable under conditions of limited traffic, provided no radio failures occur.

At present, regulation of airway traffic is designed to avoid collisions in contact flight by lateral separation of the opposing traffic, and instrument flight by altitude or vertical separations. The first requires flight along the right side of an invisible airway, and compliance with this regulation is not now enforced as it is impracticable for the average pilot to conform with this requirement. The second requires that the sensitive altimeters of the crossing airplanes all be adjusted to the same barometric setting. This is difficult to insure, particularly under conditions or heavy radio static. It also requires that the pilot flying on one of the airways change his altitude to cross over an intersecting airway. This adds to his already numerous duties in instrument flying and requires that he have an accurate knowledge of his exact position.

A contact flight frequently becomes a near instrument flight because of haze or other forms of reduced visibility and only a relatively few aircraft in the field of private flying are equipped with sensitive altimeters and radio equipment. Moreover, the angles of visibility are greatly limited in many airplanes, and newly certificated airmen are likely to be too busy flying their airplanes under such conditions to hold accurately to corrected altitudes.

Heretofore, the only accurate means by which a pilot may be sure that he is maintaining his assigned altitude for a given compass course is to continually reset a sensitive altimeter to correct for changes in barometric pressure. This necessitates his airplane being equipped with a sensitive altimeter and a radio receiver and that he give a considerable amount of attention to constant readjustment.

It is therefore proposed to provide a flight level indicator in the form of a usual aneroid barometer with altimeter mechanism and to provide the same with a static connection for pressure and means for illumination. The instrument card is in the form of a compass rose with the cardinal points and suitable subdivisions. An adjustable index marker adjacent the periphery of the card enables the setting of a desired compass course. One movable indicating pointer suffices to show registry with the set course and altitude within a range. A subdial is provided to indicate flight levels, or altitude ranges of predetermined depth each.

With the foregoing and other objects in view, the invention resides in the novel combination of parts and their particular utility in the solution of an existing problem as set forth in the specification and appended claim, certain embodiments of such structure being shown in the accompanying drawing, in which:

Figure 1:
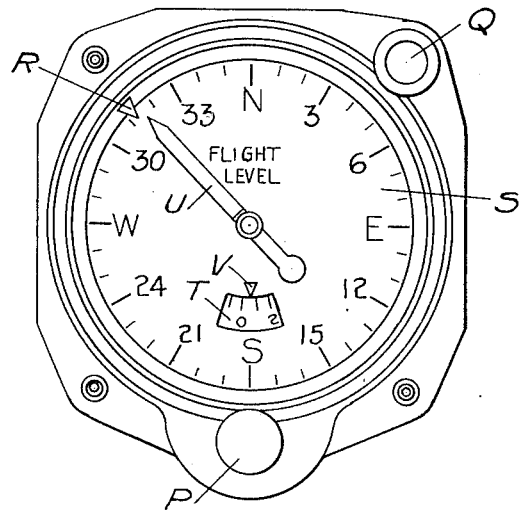
Fig. 1 is a view in front elevation of the device, showing the main and subdials, the movable pointer and adjustable compass course index marker.

Referring to the drawing, the main dial S simulates that of a magnetic compass with the four cardinal directions "N," "E," "S" and "W" (north, east, south and west) and is further subdivided into intervals of 10°, as shown, or less. While the pointer U is actuated by an aneroid barometer and altimeter mechanism to register with the calibrations on the main dial S, the latter is not graduated in units of linear measurement but in compass degrees.

Calibration of the device may be accomplished by the use of pressure values determined from a formula and by the assumption that the sea level pressure is 29.921 inches of mercury; that the temperature at sea level is 15° C. (59° F.), and that the temperature decreases with increase of altitude at the rate of 1.9812° C. (3.566° F.) per thousand feet.

The pointer U indicates the direction in which the flight should be proceeding at that altitude. The pointer is preferably designed to make one complete revolution (360°) for every change of 2,000 feet in nominal altitude to a maximum of 16,000 feet.

When the instrument is subjected to standard atmospheric sea level pressure of 29.92 inches of mercury, the pointer U points to "west." As the instrument is carried up in an airplane, the pointer moves clockwise through a 90° arc on the compass rose dial S for each increase of 500 feet. Thus, clockwise movements of 90°, 180°, or 270° indicate increases of 500 feet, 1,000 feet and 1,500 feet of nominal altitude, respectively. Counterclockwise movements indicate corresponding decreases in altitude.

There is an adjustable direction marker R on the outer edge of the dial S which can be set manually by a knob P at the bottom of the instrument to the desired magnetic heading such as shown in Fig. 1. This is merely for convenient reference to the compass bearing being flown, and also for use in accurately maintaining a flight level when it is interconnected with the automatic gyro pilot.

A subdial T which is visible through an aperture below the center of the main dial, indicates, by registry with the stationary marker V, flight levels by numbers. Each cardinal heading or 500 foot level is designated as a flight level and given a number. For example, sea level, "W," under standard atmospheric conditions is "flight level" 0; 500 feet, "N," is flight level No. 1; 1,000 feet, "E," is flight level No. 2; 1,500 feet, "S," is flight level No. 3; 2,000 feet, "W," flight level No. 4, etc., appearing in view on the subdial T.

As altitude is increased or decreased, the subdial rotates slowly and indicates against the reference index V on the fixed dial S the number of the level, or the nearest level, on which the airplane is being flown. There may be 32 flight levels of 500 feet each, totalling 16,000 feet of nominal altitude in the range of the instrument.

Flight levels 1, 5, 9, etc., are automatically indicated for flights on northerly bearings; 3, 7, 11, etc., on southerly bearings; 2, 6, 10, etc., on easterly bearings; and 4, 8, 12, etc., on westerly bearings. On intermediate headings, intermediate levels are to be used. For example, for flights on a magnetic bearing of 60°, and with the rotating pointer of the indicator on that course, a level 2/3 of the way between levels 1 and 2, or between 5 and 6, etc., would be automatically used. In such a case the flight level number nearest to the magnetic bearing flown would be the reference number used in radio communications and flight plans.

The purpose of dividing the progressive steps of nominal altitude into flight level numbers, as described above, is to provide an easy method of reference between airway traffic control centers or any communications stations and pilots in flight, and also for pilots in making their flight plans.

Figure 2:
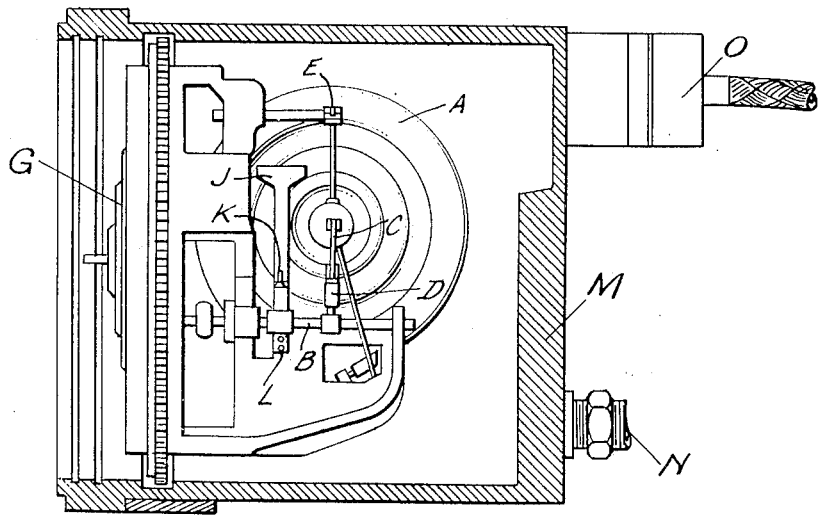
Fig. 2 is a view in longitudinal section through the instrument casing, showing the interior mechanism in elevation.

The apparatus as shown in Fig. 2 is of the same basic design as that of conventional altimeters. It consists of an evacuated diaphragm assembly A and a mechanism for multiplying its deflection. The mechanism is composed of a rocking-shaft assembly B with a diaphragm link C, a calibration arm D, a sector, and a multiplying gear train. A suitable hairspring may be secured to a member of the gear train and anchored to the mechanism body to remove backlash from the mechanism.

A temperature responsive element E is mounted on the diaphragm. This element has been set accurately to eliminate errors in indication at all altitudes due to temperature variation of the indicator and it should not be altered during flight.

The reducing gear train which operates the subdial is contained in the top plate mechanism G. The diaphragm and mechanism are maintained in perfect balance in all positions by a balance assembly J which is connected to the rocking-shaft B by a link K and a balance adjusting arm L. The entire mechanism is housed in an airtight case M having an external fitting N for connection to the static pressure line.

The instrument is provided with a static connection N for atmospheric pressure and an electrical connection O for any known type of illumination Q.

The pressure exerted upon the surface of the diaphragm at zero altitude decreases with the decrease of atmospheric pressure which occurs with increase of altitude, and this will cause the diaphragm to expand. The rocking-shaft picks up the motion by means of its calibration arm and connecting link and in turn transmits this motion through the sector, gear train, and finally to the hand-staff pinions. The pointer indicates the flight level by compass bearing and the subdial by corresponding number.

In order to be effective as a flight level control of airways and the like, all such instruments in all airplanes should indicate from a common zero as there is no satisfactory method of making barometric adjustments in flight. Common zero may be obtained by setting the pointers of all instruments at west (W) for a pressure of 29.921" Hg. All instruments should be calibrated accurately. Thus, the flight levels of different airplanes will be exactly related even though the barometric pressure changes. Although the entire series of flight levels may vary with respect to altitude measured from the earth, they remain uniformly spaced in proper relation to one another.

To use the instrument, it is necessary only that each pilot climb to his desired or assigned cruising altitude and then maintain the pointer in agreement with the magnetic bearing being flown. The compass is the reference. For example: If a pilot desired to fly at an altitude of approximately 6,000 feet (level 12) on the airways fom New York to Harrisburg via Philadelphia by contact or instruments, his procedure would be as follows:

Before taking off, or soon thereafter he would set the index marker (for ready reference) to 233° (assuming he had not calculated for drift), which is the magnetic bearing from New York to Philadelphia. After taking off he would climb until the subdial reading indicated that he had passed level 11 (nominally 5,500 feet), and continue climbing until the rotating pointer reached the index marker, or 233°. At this point he would level off and maintain this reading. If he found it necessary to fly a bearing of 245° to maintain the desired track because of drift he would climb slightly until the pointer reached 245°, adjusting the index marker to this bearing if he desired. Upon approaching the Philadelphia range he would alter his course to 293°, which is the magnetic course from Philadelphia to Harrisburg, and climb until the pointer agreed with the magnetic bearing being flown and maintain the reading in agreement with the compass.

The present invention may also be adapted to the gyro autopilot as a means of automatically controlling the altitude being flown. By the installation of the instrument as a part of the autopilot system, the manually controlled course indicator marker would be interconnected to the autopilot in such a way that when the marker is set at the desired course, and hence the desired altitude or flight level, the autopilot will bring the airplane to this level and keep it there.

The proposed device may also be used as a check for the conventional aircraft altimeter. The procedure is to set the barometric scale on the altimeter at 29.92 and read the indicated altitude. The number appearing on the subdial T of the instrument indicating the flight level, is then multiplied by 500 in order to obtain the nominal altitude in terms of linear feet. If the reading of the altimeter is correct it should correspond to the computed altitude.

I claim:

In an altimeter the combination of a main dial calibrated as a compass rose and having an aperture below the center thereof, and a fixed index on the periphery of said aperture, a pointer pivoted at the center of said main dial and adapted to make one complete revolution for every change of 2,000 feet in altitude, a direction marker located at the circumference of said dial, and adapted to be moved around the circumference of said dial to indicate the desired direction of travel, means for manually moving said marker around said dial, and a sub-dial visible through the aperture in said main dial and adapted to indicate at the said index altitude by numbers on said sub-dial.

ROBERT WILSON KNIGHT.